Jan. 13, 1942. O. J. POUPITCH 2,269,476
SELF-LOCKING SCREW
Filed Jan. 21, 1941
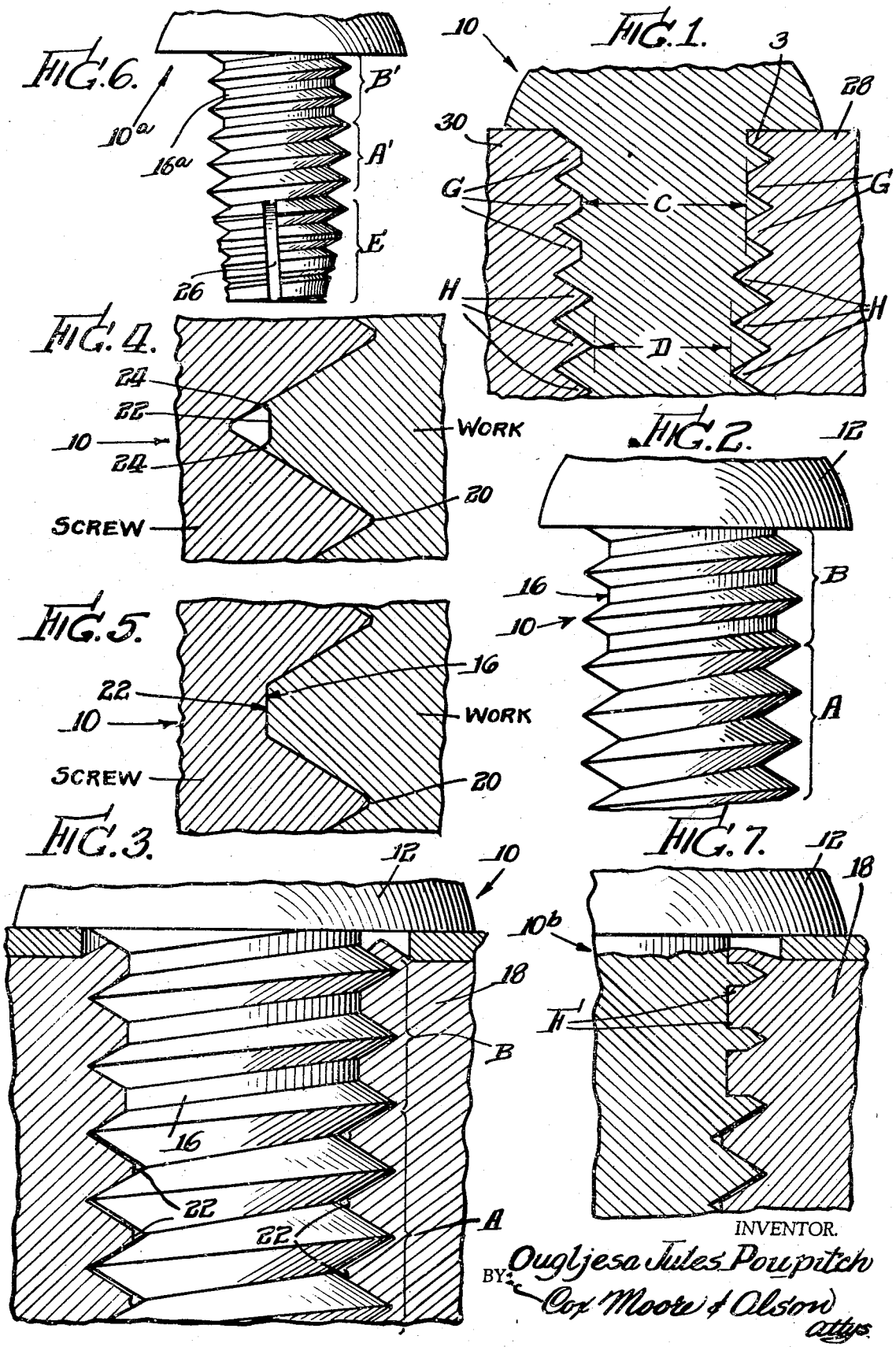
INVENTOR.
Ougljesa Jules Poupitch
BY Cox Moore & Olson
attys.

Patented Jan. 13, 1942

2,269,476

UNITED STATES PATENT OFFICE 2,269,476

SELF-LOCKING SCREW

Ougljesa Jules Poupitch, Chicago, Ill., assignor to Illinois Tool Works, Chicago, Ill., a corporation of Illinois Application January 21, 1941, Serial No. 375,183

7 Claims. (Cl. 151—14)

This invention relates generally to locking screws and more particularly to screws of the self-locking type which depend for their locking effectiveness upon the engagement or impingement with a complementary thread in a work piece.

The present invention contemplates a self-locking screw of extremely simple and practical construction which may be produced by the practice of simple and conventional thread rolling methods.

More particularly, the invention contemplates a screw of the type set forth above which is so designed as to present a conventional entering or leading section and an adjacent locking section for lockingly engaging the crest of the thread in a complementary work piece.

It is a further object of the present invention to provide a self-locking screw device as set forth above which is particularly useful in the machine screw field and to this end the invention contemplates a machine screw which is so designed that when it is finally driven home, locking engagement of the thread convolutions of the screw and associated work piece will automatically take place.

Another object of the present invention is to provide a self-locking screw as set forth above wherein an increase in strength of the screw shank in the vicinity of the head of the screw is provided, and with this in view I propose to provide a screw in which the root diameter in the vicinity of the screw head is greater than the root diameter of the remaining portion of the screw.

It is a further object of the present invention to provide a self-locking feature which is not only adaptable for conventional machine screws but also for screws which are adapted to form or cut their own thread in the unthreaded aperture of a relatively hard work piece such as metal, plastic and the like.

The foregoing and other objects and advantages will be more apparent from the following detailed description when considered in connection with the accompanying drawing, wherein:

Fig. 1 is a fragmentary vertical sectional view of a screw embodying features of the present invention shown in operative association with the die blocks employed to roll the thread on the screw shank;

Fig. 2 is a fragmentary side elevational view of the screw shown in Fig. 1 disassociated from the die blocks of Fig. 1;

Fig. 3 discloses the screw of Fig. 2 after it has been tightened within a work piece;

Figs. 4 and 5 are enlarged schematic representations of complementary threads in the screw and work piece to more clearly illustrate the manner in which the flattened bottom area of the locking section of the screw lockingly engages or impinges the complementary thread of the work, Fig. 4 disclosing the threads before such locking impingement, and Fig. 5 disclosing said threads after locking impingement has occurred;

Fig. 6 discloses a thread forming screw equipped with the locking features of the screw illustrated in Figs. 1 to 5, inclusive; and Fig. 7 is an enlarged fragmentary sectional view similar to Fig. 3 disclosing a screw member in which the locking portion thereof is of slightly modified construction.

Referring now to the drawing more in detail wherein like numerals have been employed to designate similar parts throughout the various figures, it will be seen that for the purpose of illustrating one practical embodiment of the present invention I have disclosed a screw element or member designated generally by the numeral 10. This screw member 10 is equipped with a conventional head 12 and a threaded shank which comprises two sections or portions designated by the letters A and B. The section A, which I shall refer to as the leading section, is provided with a thread conforming with conventional machine screw standards, both the root diameter and outer diameter of this section being uniform.

The thread convolutions of section B have the same outer diameter as the thread convolutions on section A and conform in cross-sectional shape with the thread convolutions on section A. It will be noted, however, that the root diameter C in Fig. 1 of the thread on section B is greater than the normal root diameter D of the thread on section A. This difference in root diameter explains the presence of the flat bottom surface 16 in the screw section B. It is this helical surface of greater diameter than the normal root diameter of the screw section A which performs the locking function of the screw when it is finally tightened within a work piece, as, for example, the work piece 18 of Fig. 3.

Attention is now directed to the disclosures in Figs. 4 and 5 which represent engaging areas of complementary screw and work threads. It is well known to those skilled in the field of screw and tap manufacture that there are certain tolerances on hole sizes for accommodating taps.

As a result, when a hole is tapped, the bottom of the thread produced in the work partakes of the desired conventional V-shape, whereas the crown of the thread in the work partakes of a rough, flattened, unfinished appearance. This is schematically illustrated in Fig. 4 wherein the bottom of the thread in the work designated by the numeral 20 presents a relatively sharp conventional V-shape, whereas the crown of the thread in the work designated by the numeral 22 is somewhat blunt and unfinished. This unfinished condition results when the tap is applied to a slightly oversized aperture in the work. In fact, the movement of the tap in the work usually causes a slight flowing of the work material and this results in the formation of a valley along the crest of the thread as defined by the helical ridges 24 illustrated in Fig. 4.

From the foregoing it will be understood that when the screw is initially inserted within the threaded aperture of the work piece 18, the screw section A which is of normal root diameter as well as outer diameter freely enters the complementary thread convolutions of the work. As the locking section B of the screw is brought into operative association with the thread in the work, the helical surface 16 moves into locking association with the unfinished work crest 22, as clearly illustrated in Fig. 5. This binding action of the helical surface 16 with the crest 22 serves to secure the screw against inadvertent retrograde rotation or loosening. Tolerances in tap and hole sizes are such as to insure some clearance between the thread convolutions of the screw and the complementary thread convolutions of the work. In Fig. 3 this clearance has been somewhat exaggerated. It will be apparent that as the head of the screw is tightened against the work there will be a tendency for the screw to pull upwardly, thereby positively engaging the upper surface of the screw thread with the complementary lower surface of the work thread, leaving a slight clearance between the remaining companion thread surfaces. In instances where the binding action of the helical surface 16 against the complementary crown of the work thread is such as to cause some flowing of the work material, the aforesaid thread clearance is sufficient to accommodate such work displacement.

In Fig. 6 the application of the present invention to a thread forming screw is disclosed. This screw is designated generally by the numeral 10a. The entering extremity of the screw designated by the bracket E is tapered so as to enable the formation of a complementary thread in an unthreaded aperture of a work piece when the screw is turned therein. In the disclosed structure a recess 26 traverses the screw section E so as to provide a cutting edge. Obviously the invention is not limited to this particular type of thread cutting screw but contemplates other screw structures whereby a thread may be cut or formed in the aperture of work pieces such as steel, Bakelite and other hard substances. Screws of this type are usually hardened to facilitate their thread forming or cutting operation. The section of the screw immediately adjacent the entering section E is designated by the bracket A' and corresponds functionally with the section A of the screw 10 previously described. Thus, the section A' is a leading section in advance of the locking section B'. The root diameter of the section B' is sufficiently larger than the normal root diameter of the section A' to cause locking impingement of the helical surface 16a with the crest 22 of the work, as previously described in connection with the screw 10.

In Fig. 7 a slightly modified screw 10b is disclosed. This screw 10b corresponds structurally with the screw 10, with the exception of the thread convolutions on the locking section. It will be noted that at the positions designated by the letter F the thread convolutions of the locking section of the screw have been relieved to accommodate flowing of the material of the work when the screw is tightened thereagainst. In some instances, the normal clearance between the thread convolutions of the screw and the thread convolutions of the work may not be sufficient to accommodate the flow which takes place. In such instances the helical relieved areas F provided in the shank of the screw 10b afford sufficient space to receive the flow of work material.

It will be apparent from the foregoing description that the locking section or portion of the screw contemplated by the present invention may be produced simultaneously with the thread rolling operation. In Fig. 1, thread rolling die blocks 28 and 30 are shown. The uppermost serrations of the die blocks designated by the letter G produce helical locking surfaces 16 in the screw 10 and the remaining serrations designated by the letter H produce the conventional thread convolutions in the leading screw section A. Obviously this screw rolling method for simultaneously producing the leading and locking sections in the screw is most economical and practical. Die blocks similar to the die blocks 28 and 30 may be used in the production of the thread forming screw 10a, whereas die blocks in which the serrations produce the locking section of the screw 10b must be of slightly modified form.

From the foregoing it will be apparent that the present invention contemplates a self-locking screw which is very efficient in operation and economical to produce. Not only does the increased root diameter of the locking section of the screw function efficiently in securing the screw against loosening but also affords to the screw increased strength in the vicinity of the screw head. In other words, the minimum diameter of the screw shank at the point where it experiences the greatest tendency to fracture is greater than the normal root diameter. While in the disclosed embodiment of the invention a relatively flat helical surface 16 of the locking section is provided, this surface or area may be of modified configuration without departing from the scope of the present invention. It is contemplated that this surface may be of a continuous or intermittent helical form depending upon the environment in which the screw is to be used.

The locking section of the screw as described herein also provides an effective fluid seal in instances where the screw is in association with fluid retaining devices such as differential housings, transmission housings, drip pans and the like. The close fit or binding between the helical surface 16 of the locking section of the screw with the crest of the work thread prevents fluid leakage in that vicinity.

Obviously the invention is not limited to the specific forms disclosed herein but is capable of other modifications and changes without departing from the spirit and scope of the claims appended hereto.

The invention is hereby claimed as follows:

1. A self-locking screw device including a shank having a threaded locking section and a leading section adjacent said locking section, said leading section having a machine screw thread of normal root diameter, the thread of said locking section having a normal outer diameter and normal crown cross section, the root diameter of the thread on said locking section being sufficiently greater than the maximum root diameter of the thread on said leading section to present a helical surface which is adapted to lockingly impinge the complementary crown portion of the thread in a workpiece.

2. A self-locking screw device including a shank having a threaded locking section, and a leading section having a thread of normal root diameter adjacent said locking section, the thread of said locking section having a normal outer diameter and a substantially uniform root diameter which is greater than the maximum root diameter of the thread on said leading section, whereby to lockingly impinge the complementary crown portion of the thread in a workpiece.

3. A self-locking screw device including a shank having a threaded locking section, and a leading section having a machine screw thread of normal root diameter adjacent said locking section, the thread of said locking section having a normal outer diameter and normal crown cross-section, the root diameter of the thread on said locking section being greater than the maximum root diameter of the thread on said leading section so as to present a flattened helical bottom surface for lockingly impinging the complementary crest of the thread in a workpiece.

4. A self-locking screw device including a shank having a threaded locking section, and a leading section having a thread of normal root diameter adjacent said locking section, the thread on said locking section having a normal outer diameter and a substantially uniform root diameter which is greater than the maximum root diameter of the thread on said leading section and presenting a helical surface between adjacent thread convolutions on said locking section for lockingly impinging the crown portion of the thread in a complementary workpiece.

5. A self-sealing thread forming screw device including a shank having a threaded holding section, and a tapered thread forming entering section adjacent said holding section for producing a normal thread in a workpiece, said holding section having a machine screw thread of normal outer diameter and a substantially uniform root diameter which is sufficiently greater than the root diameter normal for such a thread to present a helical surface which is adapted to sealingly impinge the complementary crown portion of the thread produced in a workpiece by said thread forming section.

6. A self-locking screw device including a shank having a threaded locking section, and a leading section having a thread of normal root diameter adjacent said locking section, the thread on said locking section having a normal outer diameter and a root diameter which is greater than the maximum root diameter of the thread on said leading section and presenting a helical surface between adjacent thread convolutions on said locking section for lockingly impinging the crown portion of the thread in a complementary workpiece, the thread of said locking section being relieved to accommodate flowing of the work material resulting from the impingement of said crown portion by said helical surface.

7. A self-locking screw device including a threaded shank, said threaded shank presenting a threaded locking section and a threaded leading section in advance thereof, the thread convolutions on said leading section being adjacently positioned, and of V-shaped cross-section and axial pitch conforming with conventional machine screw standards, the thread convolutions on the locking section being in helical alinement with but of less height than the thread convolutions on said leading setcion and being axially spaced from each other at their bases by a helical locking surface area having a diameter sufficiently greater than the root diameter of the thread convolutions on the leading section to effect locking impingement of said surface area with the crest of a complementary V-shaped thread in a work piece.

OUGLJESA JULES POUPITCH.